Sept. 14, 1954     T. A. KERMODE     2,688,751
DRESS SHIELD
Filed Aug. 12, 1952
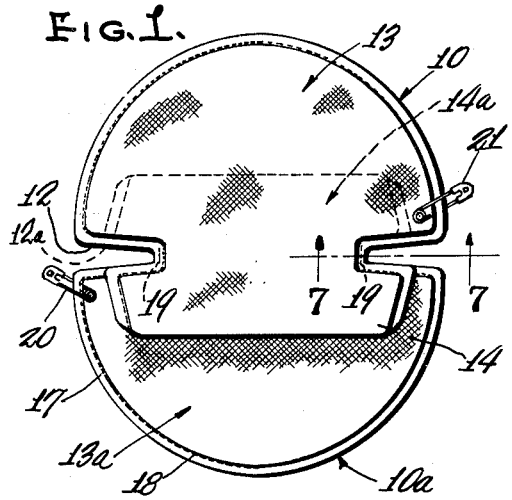
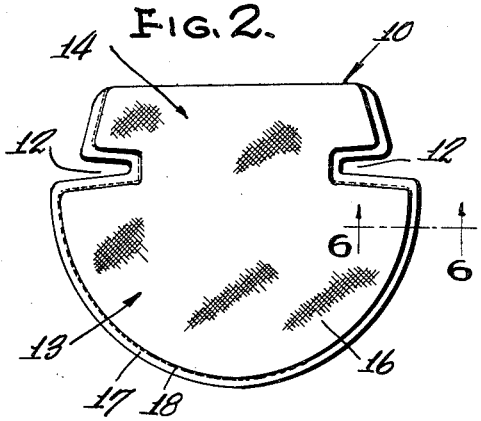
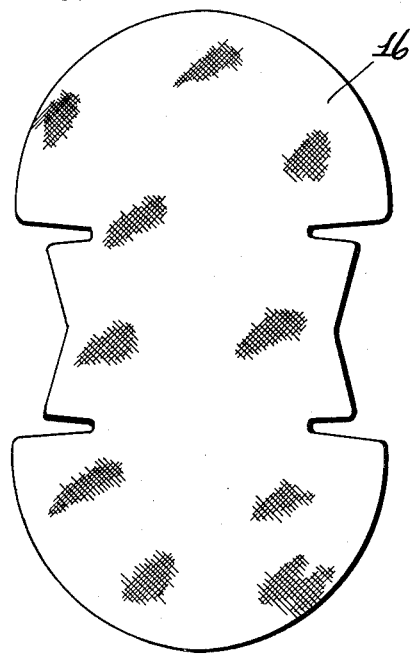
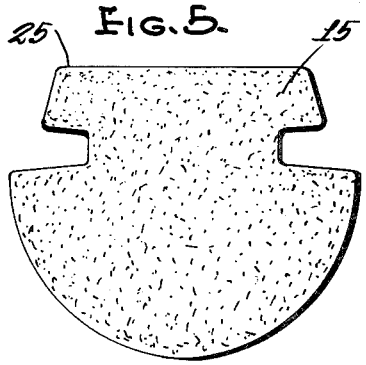
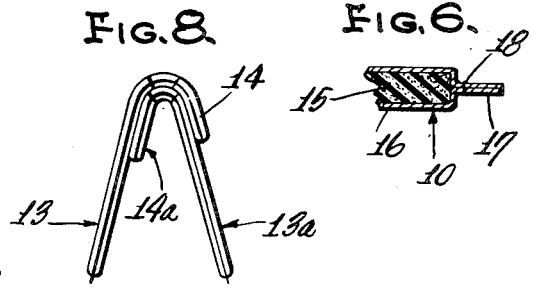
INVENTOR.
THERESA A. KERMODE
BY
*Michael Williams*
ATTORNEY Patented Sept. 14, 1954

2,688,751

UNITED STATES PATENT OFFICE 2,688,751

DRESS SHIELD

Theresa A. Kermode, Warren, Ohio

Application August 12, 1952, Serial No. 303,893

4 Claims. (Cl. 2—53)

My invention relates to dress shields and the principal object of the invention is to provide new and improved shields of this character.

Dress shields of the prior art have been made of thin absorbent material on the theory that bulkiness under the arms is to be avoided. Such theory had some merit, but the thin dress shields prior to my invention had limited absorption qualities and therefore had to be constantly replaced in order to insure proper protection. Further, prior dress shields, because of limited absorption, became stained and unsightly and therefore ineffective, and accordingly cheap, throw-away shields commanded considerable sales response. Any attempt of the prior art to provide a shield of adequate absorption qualities resulted in a bulky shield which was uncomfortable to wear and which chafed the skin of the user.

My invention provides a dress shield which possesses the desired absorption qualities and yet is soft to the skin and readily adapts itself to the configuration of the armpit of the user. My invention makes use of sponge rubber as the primary absorption means and because of the cellular formation of this material, perspiration absorbed thereby is held in generally isolated condition so that the shield may be worn for great lengths of time without fear of offending odor. Further, a dress shield incorporating sponge rubber may be easily washed and readied for use in short time. Since sponge rubber has great absorbing qualities, the fabric covering of my improved shield is not saturated with perspiration and therefore is not stained. Accordingly, the useful life of my improved shield is greatly prolonged, resulting in considerable economy.

My invention further provides maximum protection at the armpit region in that it provides increased absorbing means at the place where the greatest amount of perspiratoin occurs, and yet my improved shield is comfortable to wear because of the nature of its construction. Other and further advantages of my invention will become apparent from a study of the following detailed description and of the drawings appended thereto.

In the drawings accompanying this specification and forming a part of this application, there is shown, for purpose of illustration, an embodiment which my invention may assume, and in these drawings:

Figure 1 is a plan view of a dress shield embodying my invention,

Figure 2 is a plan view of a member forming part of the embodiment shown in Figure 1, Figure 3 is an edge view of the member shown in Figure 2, Figure 4 is a plan view showing the shape of the covering fabric prior to its application, Figure 5 is a plan view showing the shape of the sponge rubber pad, Figure 6 is an enlarged fragmentary sectional view corresponding generally to the line 6—6 of Figure 2, Figure 7 is an enlarged fragmentary sectional view corresponding generally to the line 7—7 of Figure 1, and Figure 8 is an edge view showing the embodiment of the invention folded for use.

Referring to the drawings, the embodiment of the invention herein disclosed comprises a pair of members 10, 10a which are preferably similar and are connected to form my improved shield.

The member 10 is shown in Figures 2, 3 and 6, and since construction of the members is preferably identical, it will be understood that detailed description of member 10 will apply to both members.

The member 10 is flat and generally of arcuate shape in plan. Recesses 12, 12 extend inwardly from opposite sides of the member to provide a wing portion 13 and a connected tab portion 14.

The member 10 comprises a flat pad of sponge rubber 15 (see especially Figure 5) which is shaped to generally correspond to the shape of the member but is slightly smaller in outline for a purpose to appear. A fabric covering 16 is provided for the pad 15 and preferably the covering is formed of a blank as shown in Figure 4. The fabric blank is shaped similar to a pair of pads 15 which may be considered as joined along a common edge 25 (which in this instance is generally rectilinear), the blank being slightly greater in peripheral size so that it may be folded about the pad 15 and provide extending marginal surfaces 17 which are secured, as by stitching 18 (see especially Figure 6). It will therefore be appreciated that the fabric completely envelopes the pad 15.

The fabric may be of any suitable material which has sufficient porosity to enable perspiration to be absorbed by the pad 15. I have found that a nylon fabric is well suited for the purpose because of its ease of washing and drying and because of its wearing qualities, although it will be understood that any other suitable fabric may be used.

As before mentioned, the members 10 and 10a are preferably similar and accordingly similar parts of member 10a are designated by numbers used to identify parts of member 10 with the exception that such numbers are supplemented by the suffix "a."

The member 10, 10a, are assembled in reverse relationship, as shown in Figure 1, so that the recesses 12, 12a of the members are in overlying alignment. Accordingly, the tab portion of one member overlies a part of the shield portion of the other member and, as seen in Figure 1, the tab portion 14 of the member 10 overlies a part of the shield portion 13a of the member 10a, whereas the tab portion 14a of the member 10a underlies a part of the shield portion 13 of the member 10.

The members 10, 10a are connected together, and to provide for flexibility of the shield it has been found desirable to connect the members only along certain peripheral margins of the recesses 12, 12a, as shown by the localized stitching at 19, 19 at the interior of recesses 12, 12a. Such connection of the members 10, 10a permits considerable distortion thereof, so that the shield may be flexed into comfortable alignment with the armpit area of the user.

Flexing of the shield is further enhanced by the fact that the fabric 16 may be cut on a bias so that its threads are bias-positioned with respect to the sides of the respective members 10, 10a, as shown by shading in the various views.

In use, the shield is folded generally along a transverse line extending between recesses 12, 12 and 12a, 12a. In folded relation, the wing portions 13, 13a are in side-by-side relation, as seen in Figure 8, and the tabs 14, 14a overlie the adjacent parts of respective wing portions to form a double thickness at the armpit area, thus greatly increasing the absorbing power of the shield at this place. Since the fabric is formed of a one-piece blank and folded about the pad 15, the covered margin 25 provides a smooth terminal end for the respective tabs 14, 14a and thus eliminates any folds or stitching in this area which ordinarily might cause chafing of the user's skin. In addition, both fabric and sponge rubber provide a shield so soft that its use causes no uncomfortable binding or pressure in the armpit area.

Means are provided for connecting the shield to the garment of a user so as to hold the shield in place, and at present it is preferred to use fastening devices, such as safety pins 20, 21. As herein disclosed, the pin 20 is secured to the wing portion 13a adjacent to and on one side of the fold line and the pin 21 is positioned on the opposite side of the shield and is secured to the wing portion 13 adjacent to and on the opposite side of the fold line. In securing the pins to the garment, the shield is stretched laterally a certain amount, as by pulling apart on the pins 20, 21, and such stretching urges the shield toward folded relation, therefore relieving the user from pressure which may otherwise be caused by folding action.

In the foregoing description I have referred to my invention as a dress shield, but the shield has been found of great use to men and women alike and accordingly the term "dress" is to be understood as used to denote any type of wearing apparel.

In view of the foregoing it will be apparent to those skilled in the art that I have accomplished at least the principal object of my invention and it will also be apparent to those skilled in the art that the embodiment herein described may be variously changed and modified, without departing from the spirit of the invention, and that the invention is capable of uses and has advantages not herein specifically described, hence it will be appreciated that the herein disclosed embodiment is illustrative only, and that my invention is not limited thereto.

I claim:

1. A dress shield comprising two separate, similar arcuate-shaped flexible members, each having recesses extending inwardly from opposite sides to provide a wing portion and a tab portion, said members being reversely arranged with a tab portion of one overlying a part of a wing portion of the other and with the recesses of said members generally in overlapping alignment, and means at the defining margins of said recesses for connecting said members, said members being foldable along a line generally extending between the recesses of each member to provide a doubled portion for disposition adjacent to the armpit area of a user.

2. A dress shield comprising two separate, similar, arcuate-shaped flexible members, each comprising a fabric-covered sponge rubber pad, and each having recesses extending inwardly from opposite sides to provide a wing portion and a tab portion, said members being reversely arranged with a tab portion of one overlying a part of a wing portion of the other and with the recesses of said members generally in overlying alignment, said members being connected together by stitching at the defining margins of said recesses, and in use said members being folded along a line generally extending between the recesses of each member to provide a doubled portion for disposition adjacent to the armpit of a user.

3. A dress shield comprising two separate, similar, arcuate-shaped flexible members, each having recesses extending inwardly from opposite sides to provide a wing portion and a tab portion, said members being reversely arranged with a tab portion of one overlying a part of a wing portion of the other and with the recesses of said members generally in overlying alignment, said members being connected together by localized stitching along interior parts of the defining margins of said recesses, and in use said members being folded along a line generally extending between the recesses of each member to provide a doubled portion for disposition adjacent to the armpit of a user, and connecting means for connecting said shield to the garment of a user, comprising a fastening device on each member, said fastening devices being generally on opposite sides of the fold line.

4. A dress shield to absorb perspiration at the armpit area of a person comprising two similar members, each having a generally sector shaped wing portion and an extending generally T shaped tab portion, said members being reversely arranged and connected together so that a tab portion of one overlies a part of and is generally centered with a wing portion of the other, and said wing portions being foldable one on the other whereby said tab portions combine with said wing portions in the fold area to provide a double protecting thickness at the armpit area.

References Cited in the file of this patent

UNITED STATES PATENTS

| Number | Name | Date |
|---|---|---|
| 174,099 | Wilber | Feb. 29, 1876 |
| 238,742 | Witsil | Mar. 8, 1881 |
| 312,320 | Betty | Feb. 17, 1885 |
| 1,897,952 | Dupont | Feb. 14, 1933 |
| 1,979,983 | Meek | Nov. 6, 1934 |
| 2,434,830 | Billins et al. | Jan. 20, 1948 |